(No Model.)

J. HALLEY & A. BARR.
APPARATUS FOR HOLDING AND CARRYING EGGS.

No. 253,697. Patented Feb. 14, 1882.

Witnesses:
H. Turner
James T. Tobin

Inventors:
John Halley and
Alexander Barr
by their Attorneys
Howson and Sons

UNITED STATES PATENT OFFICE.

JOHN HALLEY AND ALEXANDER BARR, OF GLASGOW, COUNTY OF LANARK, SCOTLAND.

APPARATUS FOR HOLDING AND CARRYING EGGS.

SPECIFICATION forming part of Letters Patent No. 253,697, dated February 14, 1882.

Application filed January 3, 1882. (No model.) Patented in England August 21, 1880, in France September 30, 1880, in Belgium October 1, 1880, and in Germany October 12, 1880.

*To all whom it may concern:*

Be it known that we, JOHN HALLEY and ALEXANDER BARR, residing at Glasgow, in the county of Lanark, Scotland, have invented certain Improvements in Apparatus for Holding or Carrying Eggs, (for which we obtained British Letters Patent dated August 21, 1880, No. 3,396, and still in force,) of which the following is a specification.

Our invention relates to the holding or carrying of eggs in large or small quantities; and it consists in fitting boxes, baskets, barrels, trays, frames, or other receptacles with improved spring-holders, which will hold the eggs securely, notwithstanding variations in size, and which are such as to prevent injury from ordinary shaking or concussion, or from the turning over of the receptacles or packages. The use of straw or other packing material is dispensed with, and possible contamination of the eggs by such material completely avoided.

The holder, as made according to our invention, for each egg comprises three spring members or fingers, which are fixed to a bottom piece of wood or metal or other suitable material, and forming a separate foot or stand for each holder, or forming part of a box, tray, frame, or other receptacle constructed for holding a number of eggs. The spring members or fingers are shaped each with a concave curvature adapted to the sides of an egg when placed on end, the upper part of such concave curvature closing or contracting over the egg to a sufficient extent to prevent it from falling out when the holder is inverted, while the extreme upper ends of the members or fingers are shaped with an outward flare—such that when an egg is being introduced its end acts like a wedge in opening or separating the members or fingers, which close inward again by their spring action when the egg reaches the concave holding parts.

The members or fingers are by preference made of simple round wire, of steel or other sufficiently elastic metal, which wire may be tinned or otherwise preservatively coated. It will, however, be obvious that wire of a flat or other shape may be used instead of round wire.

Figure 1:
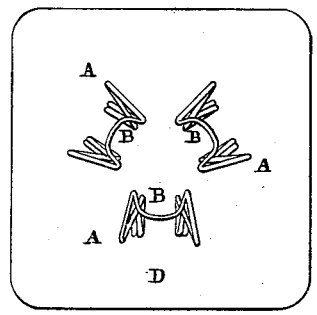
Figure 3:
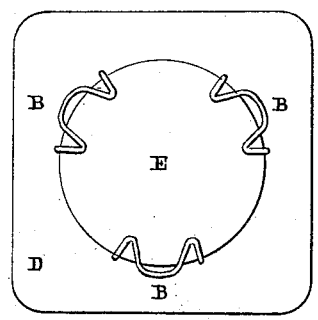
Figure 2:
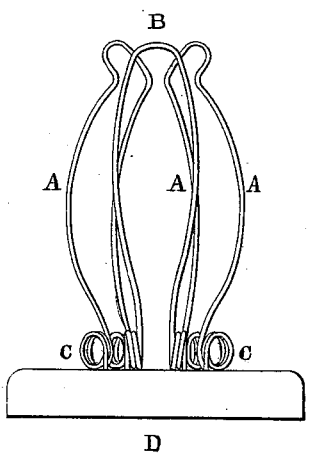
Figure 4:
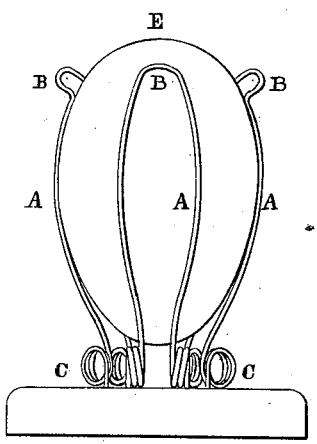

On the sheet of drawings, Figure 1 is a plan of a single holder as without an egg; and Fig. 2 is a corresponding elevation, while Figs. 3 and 4 are a plan and elevation of the holder as with an egg in it.

The holder consists of three members or fingers, A, each of which is bent in the form of a loop, and with a curvature to suit the form of the egg E. The upper part of each member or finger is curved inward, the extreme end B being, however, turned outward, so that when the three members or fingers are combined they retain the egg, while their extreme upper ends, B, form a conical or flared mouth to facilitate the insertion of the egg. Spring-coils C are formed on the lower parts of the wires, and the ends of the wires are fixed in a board, bar, or plate, D.

In the case of wood the wire ends may be clinched, and in the case of metal they may be soldered, or they may be fixed in any other convenient way.

We claim as our invention—

1. An egg-holder having spring-fingers, each shaped with a concave curvature adapted to the sides of an egg, and having its extreme upper end shaped with an outward flare, whereby an egg on being introduced acts like a wedge in opening the fingers, which close inward again by their spring action when the egg reaches the concave holding parts.

2. An egg-holder consisting of a plate with a number of wire fingers formed into spring-coils C at their lower parts.

In testimony whereof we have signed our names to this specification in the presence of two subscribing witnesses.

JOHN HALLEY.
ALEXANDER BARR.

Witnesses:
EDMUND HUNT,
DAVID FERGUSON.